July 5, 1966 E. WEISS 3,258,982
VARIABLE CAM CORRECTOR MECHANISM
Original Filed March 21, 1963 2 Sheets-Sheet 1

INVENTOR.
ERNEST WEISS
BY
ATTORNEY

July 5, 1966              E. WEISS              3,258,982
VARIABLE CAM CORRECTOR MECHANISM
Original Filed March 21, 1963              2 Sheets-Sheet 2
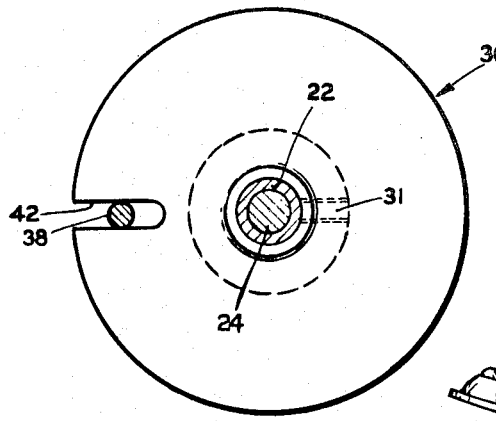
FIG. 3
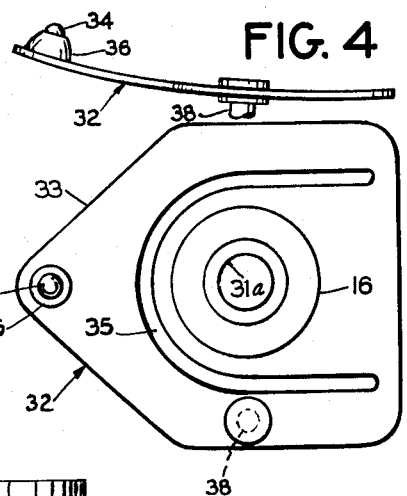
FIG. 4
FIG. 5
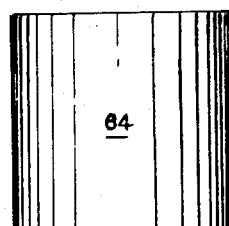
FIG. 6
INVENTOR.
ERNEST WEISS
BY
ATTORNEY

United States Patent Office 3,258,982
Patented July 5, 1966

3,258,982
VARIABLE CAM CORRECTOR MECHANISM
Ernest Weiss, Maywood, N.J., assignor to The Bendix Corporation, a corporation of Delaware
Continuation of application Ser. No. 266,891, Mar. 21, 1963. This application June 9, 1965, Ser. No. 462,651
15 Claims. (Cl. 74—393)

The invention relates to a variable cam corrector mechanism and more particularly to an improved and simplified mechanism for adjusting the relation between rotary motions at input and output shafts by adding to or subtracting from the rotation imparted to the output shaft by the input shaft in a highly accurate and precise manner and to a mechanism which simplifies prior structures disclosed and claimed in U.S. Patent No. 2,896,464, granted July 28, 1959, to Paul L. Reuter and Ernest Weiss, and U.S. Patent No. 2,968,964, granted January 24, 1961 to Harry G. Anastasia and William F. Watson, now Reissue Patent No. 25,513 granted January 14, 1964, all of which patents have been assigned to The Bendix Corporation, assignee of the present invention. The present application is a continuation of application Serial No. 266,891, filed March 21, 1963.

An object of the invention is to provide a simplified variable cam corrector mechanism including a flexible cam follower driven by an input shaft and having a pin projecting from the cam follower in driving relation with a disc clamped to an output shaft in an arrangement in which flexing of the cam follower caused by the surface contour of a cooperating cam will result in an angular motion being imparted to the pin projecting from the cam follower and resting against a polished face in the slot of the disc clamped to the output shaft so that a corrective motion may be imparted to the output shaft to effect a desired adjustment in the output shaft relative to the input shaft.

Another object of the invention is to provide in a mechanism of a type including an input shaft, an output shaft, a device for drivingly connecting said input and output shafts, said connecting device being rotatable by said input shaft, variable control gain means, and a cam follower means in contacting relation with said cam means and operated thereby to adjust said connecting device so as to move the output shaft relative to the input shaft, the improvement comprising: said connecting device including a pin carried by the cam follower, a slotted disc carried by the output shaft and the pin mounted in driving relation in the slot of the disc so as to drivingly connect said input and output shafts and the pin being angularly adjustable by the cam follower means for actuating said disc so as to adjust the output shaft relative to said input shaft in accordance with the contour of the cam means.

Another object of the invention is to provide a device arranged to effect correction of small angular errors found in electromechanical components.

Another object of the invention is to provide novel means to compensate or correct for those errors inherent in the accuracy limitations of rotary electrical components, such as synchros, resolvers, or in the gear trains or driving connections therefor.

Another object of the invention is to provide novel rotating cam correction means operable in conjunction with one of the limited accuracy electrical and mechanical components to effect a desired correction.

Another object of the invention is to provide a compensating cam correcting mechanism which may be directly assembled to the respective electrical component and operable in conjunction with such component so as to reduce an angular inaccuracy arising from errors of ±15 or 30 minutes of arc to less than one minute of arc and to a device operable to correct inaccuracies attributable to such angle-dependent errors such as electrical error output from such electrical component and/or errors caused by imperfect gears, eccentric shafts, and accuracy limitations in rotary electrical components.

Another object of the invention is to incorporate in a variable cam corrector mechanism novel means to effect minute angular correction while maintaining a reasonable "sense of feel" while adjusting to effect the desired angle of correction.

These and other objects and features of the invention are pointed out in the following description in terms of the embodiment thereof which is shown in the accompanying drawings. It is to be understood, however, that the drawings are for the purpose of illustration only and are not a definition of the limits of the invention. Reference is to be had to the appended claims for this purpose.

In the drawings:

FIGURE 3 is an enlarged view of the slotted disc provided in the variable cam corrector assembly of FIGURE 1 and clamped to the driven output shaft.

FIGURE 4 is an enlarged detailed side view and FIGURE 5 is an enlarged detailed front view of the flexible cam follower drive plate embodied in the variable cam corrector mechanism of FIGURE 1 and showing the location of the adjustable drive pin and the cam follower ball and retainer mounted on the plate.

FIGURE 6 is a detailed assembly view showing the variable cam corrector mechanism of FIGURE 1 directly assembled on the driven shaft of a rotary electrical component, such as a synchro.

Figure 1:
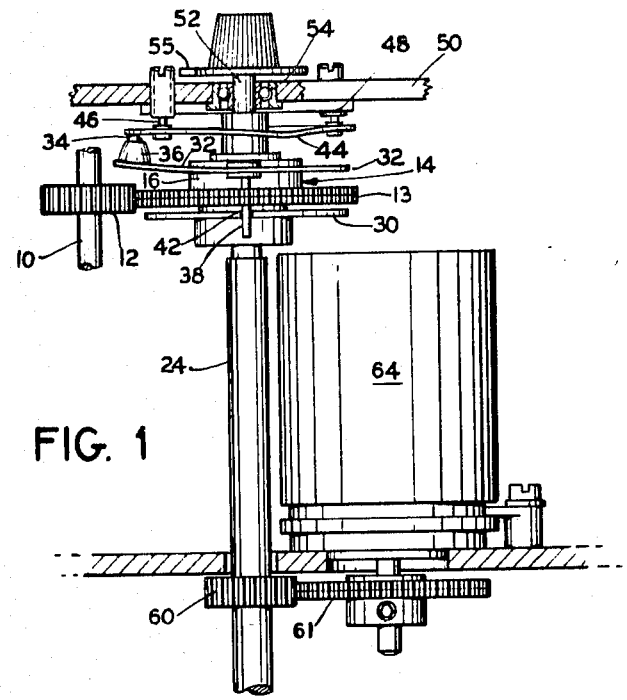
FIGURE 1 is a fragmentary assembly view illustrating a variable cam corrector mechanism embodying the invention and used in conjunction with a rotary electrical component to reduce angular inaccuracies arising from errors in the electrical components and/or errors caused by imperfect gears, or eccentricity in the output or input shafts, and like mechanical devices.

Referring to the drawing of FIGURE 1, there is indicated by the numeral 10 a drive or input shaft operably connected by gears 12 and 13 to a cam follower assembly 14, including a hub 16 rotatably mounted on ball bearings 18 and 20 (FIGURE 2) carried by a sleeve 22 drivingly affixed to a driven or output shaft 24. The sleeve has an annular flange 26 at one end to hold the bearing 18 in place while the bearing 20 is held in place on the sleeve 22 by a disc 30 clamped to the sleeve 22 by a fastening screw 31. Further secured to the hub 16, at one end thereof is the gear 13, while there is secured to the opposite end of the hub 16 a flexible cam follower drive spring 32, shown in greater detail in FIGURES 4 and 5. The flexible cam follower drive spring 32 includes a hub portion 31a for mounting the driver plate on hub 16 and a spring tab portion 33 secured to the hub portion at one end and separated therefrom by a substantially U-shaped slot 35 extending around the hub portion toward the end of the driver plate to permit the spring tab portion to flex relative to the hub portion. The base of the U-shaped slot is concentric with the hub portion. A cam follower ball 34 carried in a retainer portion 36 is mounted on the spring tab portion 33.

Figure 2:
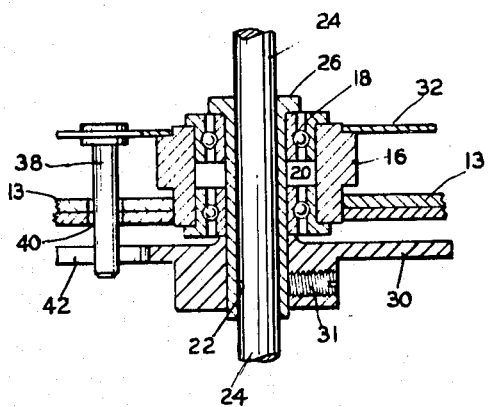
FIGURE 2 is an enlarged detailed sectional view of the hub assembly of FIGURE 1 showing the operative relationship of the flexible cam follower drive plate and the angularly adjustable drive pin projecting axially from the cam follower plate in driving relation with a slotted disc clamped to the output shaft.

Further, projecting from spring tab portion 33 of flexible cam follower drive spring 32 is a drive pin 38 spaced angularly from cam follower ball 34 substantially 90° about the axis of rotation of cam follower drive spring 32. The drive pin 38 extends through and is freely movable in a slot 40 in the gear 13 while an end portion of the drive pin 38 rests against the polished face of a slot 42 provided in the disc 30, as shown in FIGURES 2 and 3.

Further, the cam follower ball 34 carried in the retainer portion 36 is best shown in FIGURE 1 and bears against the surface of a flexible cam plate 44 operatively supported by suitable adjustable mounting screws, two of which are shown in FIGURE 1 and indicated by the numerals 46 and 48. The mounting screws 46 and 48 are arranged to vary the contour surface of the flexible cam plate 44 and are adjustably mounted in a supporting plate 50.

An end portion 52 of the shaft 24 is rotatably mounted in ball bearings 54 carried in the supporting plate 50 and the end portion 52 of the shaft 24 has affixed thereto a suitable pointer 55 arranged to cooperate with suitable indicia, not shown, on the supporting plate 50.

In the aforenoted arrangement, motion will be imparted by the drive shaft 10 through the gears 12 and 13 to the hub 16 and cam follower drive plate 32 and thereby transmitted through the pin 38 to the disc 30 clamped to the sleeve 22 and thereby drivingly connected to the driven or output shaft 24 which in turn is drivingly connected through gears 60 and 61 to a rotary electrical component 64 which may be a conventional synchro, potentiometer, or any other electrical component.

In the aforenoted arrangement inherent inaccuracies in the rotary electrical component 64 or in the gears, gear trains, or eccentricities of the operating shafts may be compensated or corrected through suitable adjustment of cam follower assembly 14. This is effected by the operator adjusting the screws 46 and 48 carrying the flexible cam plate 44 so as to so adjust the contour thereof relative to the cam follower ball 34 as to cause an angular adjustment of the drive pin 38 to effect a compensating adjustment of the driven or output shaft 24 relative to the input shaft 10 so as to thereby cause the output shaft 24 to lead or lag the angular adjustment of the drive or input shaft 10 and thereby compensate for the aforenoted inaccuracies.

The variable cam corrector mechanism, as shown in FIGURE 6, may be directly assembled to the driven shaft of the rotating electrical component which may correspond to the shaft 24, shown in the hub assembly of FIGURE 2. In the arrangement of FIGURE 6, corresponding numerals indicate corresponding parts to those heretofore described with reference to the assembly view of FIGURES 1 and 2.

*Operation of variable cam corrector mechanism*

In the assembly of the variable cam corrector mechanism of FIGURES 1 and 6, rotation of the gear 13 by the drive shaft 10 and gear 12 will result in a simple transfer of motion to the cam follower drive plate 32 to thereby cause the pin 38 to actuate the disc 30 and in turn drive the shaft 24 operatively connected thereto through the sleeve 22 to rotate the shaft 24 degree for degree in an identical manner as the gear 13 while the cam follower ball 34 will ride along the face of the flat cam 44.

However, upon setting the adjustment screws 46 and 48 in the supporting plate 50 so as to effect a distortion of the flexible cam plate 44, the cam follower drive plate 32 upon rotation of the gear 13 will be angularly positioned in following the contour of the cam plate 44 so as to in turn angularly position the drive pin 38 in the slot 40 relative to the gear 13, as best shown in FIGURE 6, and which angular adjustment of the drive pin 38 will in turn cause the plate 30 to be adjusted angularly relative to the gear 13 and thereby impart a compensating angular adjustment to the driven shaft 24 to cause the angular position of the driven shaft 24 to lead or lag the angular position of the drive shaft 10 so as to compensate for the inherent errors in the rotary electrical component 64, such as a synchro, or electrical resolver or potentiometer, and also may serve to compensate or correct for those errors in the assembly caused by imperfect gears or operating shafts of the gear trains.

It will be seen then that the variable cam corrector mechanism provides a novel arrangement of extreme simplicity in which a one piece flexible cam follower and drive pin and cooperating slotted driven shaft disc assembly permits elimination of the more complex conventionally used ball bearing hinges and shafts to effect the desired correction or compensation.

Although only one embodiment of the invention has been illustrated and described, various changes in the form and relative arrangement of the parts, which will now appear to those skilled in the art may be made without departing from the scope of the invention. Reference is, therefore, to be had to the appended claims for a definition of the limits of the invention.

What is claimed is:

1. In a mechanism of a type including an input shaft, an output shaft, a device rotatable by said input shaft for drivingly connecting said input and output shafts, cam means, cam follower means coaxial with and engaging said cam means to adjust said connecting device so as to move the output shaft relative to the input shaft, the improvement comprising: said connecting device including a pin carried by the cam follower extending in a parallel and an offset position to said cam axis, a slotted disc carried by and in coaxial relation to the output shaft and wherein the pin is slidably mounted in driving relation in the slot of the disc so as to drivingly connect said input and output shafts and the pin being angularly adjustable by the cam follower means for angularly actuating said disc so as to adjust the output shaft relative to said input shaft in accordance with the contour of the cam means to effect a desired lead or lag of the input shaft relative to the output shaft.

2. In a mechanism of a type including an input shaft, an output shaft, a device rotatable by said input shaft for drivingly connecting said input and output shafts, variable control cam means, cam follower means coaxial with and in contacting relation to said cam means and operated thereby to adjust said connecting device so as to move the output shaft relative to the input shaft, the improvement comprising: said connecting device including first coupling means carried by and radially offset from the axis of said cam follower, second coupling means drivingly connected to and radially offset from the output shaft and slidably engaging said first coupling means, said first and second coupling means being arranged in said coupling relation for drivingly connecting said input and output shafts in one sense, and said first coupling means being operated by said cam follower means for angularly actuating said second coupling means in a second sense so as to angularly adjust the output shaft relative to the input shaft in accordance with the position of said cam means to effect a desired lead or lag of the input shaft relative to the output shaft.

3. The combination defined by claim 2 in which the first coupling means includes a pin carried by the cam follower and projecting axially therefrom, and the second coupling means includes a disc drivingly connected to the output shaft, said disc having a slot in which said pin is slidably mounted in driving relation, the pin being effective to drivingly couple the input shaft to the output shaft in said one sense, and the pin being angularly adjustable by the cam follower so as to adjust the disc and thereby the output shaft relative to said input shaft in accordance with the contour of the cam means.

4. A variable cam corrector mechanism comprising: an input shaft, an output shaft, a flexible cam track, means for supporting said flexible cam track, said supporting means including a plurality of adjustable members for carrying the flexible cam track whereby adjustment of said members may be effective to vary the contour of said cam track, a cam follower rotatably mounted on said output shaft and in a coaxial relation to and in contacting relation with said cam means, means drivingly connecting said cam follower to said input shaft, a pin projecting from said cam follower parallel to the axis of said cam track, a disc drivingly connected to said output shaft, said disc having a slot in which said pin is mounted in driving relation with said disc to drivingly connect said input and output shafts in one sense, and said pin being angularly adjustable by said cam follower for angularly actuating said disc so as to angularly adjust the output shaft relative to said input shaft in accordance with the contour of the cam track to effect a desired lead or lag of the input shaft relative to the output shaft.

5. Cam corrector mechanism for effecting a desired lead or lag of an output shaft driven by an input shaft, comprising a member fixed to the output shaft, cam means, cam follower means driven by the input shaft and including a flexible drive plate mounting a cam follower yieldingly urged into engagement with the cam means and an element engaging the member so that rotation of the input shaft rotates the output shaft and, as the cam follower rides over the cam means, the element is advanced or retarded relative to the input shaft and provides for relative movement between the input and output shafts in accordance with the contour of the cam means to effect desired lead or lag of the output shaft relative to the input shaft.

6. The structure of claim 5 wherein the driver plate comprises a hub portion for mounting the driver plate and a spring tab portion secured to the hub portion at one end and separated therefrom by a slot extending around the hub portion toward the one end of the driver plate to permit the spring tab portion to flex relative to the hub portion, and the cam follower and element being mounted on the spring tab portion.

7. The structure of claim 6 wherein said cam follower and element are spaced angularly substantially 90 degrees about their axis of rotation.

8. Cam corrector mechanism drivingly coupling an input shaft to an output shaft and effecting a desired lead or lag of the output shaft relative to the input shaft, comprising a member fixed to the output shaft, cam means, cam follower means driven by the input shaft and including a flexible driver plate coaxial with the output shaft and mounting a cam follower yieldingly urged into engagement with the cam means and an element engaging the member so that rotation of the input shaft rotates the output shaft, and the cam follower and element being spaced substantially 90° about their axis of rotation so that as the cam follower rides over the cam means, the element is advanced or retarded relative to the input shaft and provides for relative movement between the input and output shafts in accordance with the contour of the cam means to effect desired lead or lag of the output shaft relative to the input shaft.

9. Cam corrector mechanism for effecting a desired lead or lag of an output shaft driven by an input shaft, comprising a member fixed to the output shaft, adjustable cam means, cam follower means driven by the input shaft and including a spring driver plate mounting a cam follower yieldingly urged into engagement with the cam means and an element engaging the member so that rotation of the input shaft rotates the output shaft and, as the cam follower rides over the cam means, the spring plate flexes and the element is advanced or retarded relative to the input shaft and provides for relative movement between the input and output shafts in accordance with the contour of the cam means to effect desired lead or lag of the output shaft relative to the input shaft.

10. Variable cam corrector mechanism for effecting a desired lead or lag of an output shaft with respect to an input shaft, comprising a member fixed to the output shaft and having an aperture therein, adjustable cam means, cam follower means driven by the input shaft and including a flexible driver plate coaxial with the output shaft and mounting a cam follower yieldingly urged into engagement with the cam means and a pin extending into the aperture in the member, the cam follower and pin being angularly spaced substantially 90° about the axis of rotation of the plate whereby rotation of the input shaft rotates the output shaft, and as the cam follower rides over the cam means, the pin is advanced or retarded relative to the input shaft and provides for relative movement between the input and output shafts in accordance with the contour of the cam means to effect desired lead or lag of the output shaft relative to the input shaft.

11. Variable cam corrector mechanism for effecting a desired lead or lag of an output shaft with respect to an input shaft, comprising a member fixed to the output shaft and having an aperture therein, adjustable cam means, cam follower means driven by the input shaft and including a spring driver plate coaxial with the output shaft and mounting a cam follower yieldingly urged into engagement with the cam means and a pin extending into the aperture in the member, the cam follower and pin being angularly spaced substantially 90° about the axis of rotation of the plate whereby rotation of the input shaft rotates the output shaft and, as the cam follower rides over the cam means, the spring plate flexes and the pin is advanced or retarded relative to the input shaft and provides for relative movement between the input and output shafts in accordance with the contour of the cam means to effect desired lead or lag of the output shaft relative to the input shaft.

12. Cam follower means for drivably connecting an input shaft and an output shaft and providing for relative movement between the input and output shafts in accordance with the contour of cam means to effect desired lead or lag of the output shaft relative to the input shaft, comprising a flexible driver plate having a hub portion for mounting the driver plate and a spring tab portion secured to the hub portion at one end and separated therefrom by a slot extending around the hub portion toward the one end of the driver plate to permit the spring tab portion to flex relative to the hub portion, and a cam follower and a driving element mounted on the spring tab portion.

13. The structure of claim 12 wherein the cam follower and driving element are spaced angularly substantially 90°.

14. The structure of claim 12 wherein the slot is substantially U-shaped and the base of the U is concentric with the hub portion.

15. The structure of claim 12 wherein the cam follower and driving element are spaced angularly substantially 90° and the slot is substantially U-shaped and the base of the U is concentric with the hub portion.

No references cited.

DAVID J. WILLIAMOWSKY, *Primary Examiner.*

L. H. GERIN, *Assistant Examiner.*